(12) United States Patent
Salem et al.

(10) Patent No.: US 11,440,255 B2
(45) Date of Patent: Sep. 13, 2022

(54) ADDITIVE MANUFACTURING UNDER GENERATED FORCE

(71) Applicant: MRL MATERIALS RESOURCES LLC, Beavercreek, OH (US)

(72) Inventors: Ayman A. Salem, Beavercreek, OH (US); Daniel P. Satko, Centerville, OH (US)

(73) Assignee: MRl. Materials Resources LLC, Beavercreek, OH (US)

( * ) Notice: Subject to any disclaimer, the term of this patent is extended or adjusted under 35 U.S.C. 154(b) by 415 days.

(21) Appl. No.: 16/571,473

(22) Filed: Sep. 16, 2019

(65) Prior Publication Data

US 2020/0086567 A1 Mar. 19, 2020

Related U.S. Application Data

(60) Provisional application No. 62/731,549, filed on Sep. 14, 2018.

(51) Int. Cl.
| | |
|---|---|
| *B29C 64/241* | (2017.01) |
| *B29C 64/245* | (2017.01) |
| *B29C 64/205* | (2017.01) |
| *B29C 64/393* | (2017.01) |
| *B29C 64/153* | (2017.01) |

(Continued)

(52) U.S. Cl.
CPC .......... *B29C 64/241* (2017.08); *B29C 64/153* (2017.08); *B29C 64/205* (2017.08); *B29C 64/245* (2017.08); *B29C 64/393* (2017.08); *B29C 64/118* (2017.08); *B29C 64/268* (2017.08); *B29C 64/295* (2017.08); *B33Y 30/00* (2014.12); *B33Y 40/00* (2014.12); *B33Y 50/02* (2014.12)

(58) Field of Classification Search
CPC ... B29C 64/153; B29C 64/205; B29C 64/241; B29C 64/245; B29C 64/268; B29C 64/295; B29C 64/393; B33Y 30/00; B33Y 50/02
See application file for complete search history.

(56) References Cited

U.S. PATENT DOCUMENTS

2005/0287031 A1* 12/2005 Macke, Jr. ............ B29C 64/153
419/53
2013/0280547 A1* 10/2013 Brandl .................... B22F 10/20
427/551

(Continued)

FOREIGN PATENT DOCUMENTS

CN 206749066 U * 12/2017

*Primary Examiner* — Jerzi H Moreno Hernandez
(74) *Attorney, Agent, or Firm* — Thomas E. Lees, LLC

(57) ABSTRACT

A system for additive manufacturing under generated force includes a mechanical arm, a build platform, a build platform controller, a material delivery system controller, a laser scan system, a laser scan system controller, a motor controller and a master controller. The master controller determines a location of the material delivered to the build platform. The master controller further calculates a rate of rotation of the build platform as a function of the location of the material delivered and a desired centrifugal acceleration. The master controller further calculates an adjustment factor to correlate a rotation of the laser scan system to a rotation of the mechanical arm as a function of the location of the material delivered and a calculated rate of rotation of the build platform.

8 Claims, 1 Drawing Sheet

(51) Int. Cl.
  *B33Y 50/02* (2015.01)
  *B33Y 30/00* (2015.01)
  *B29C 64/268* (2017.01)
  *B29C 64/118* (2017.01)
  *B29C 64/295* (2017.01)
  *B33Y 40/00* (2020.01)

(56) References Cited

U.S. PATENT DOCUMENTS

| | | | |
|---|---|---|---|
| 2014/0271961 A1* | 9/2014 | Khoshnevis | C04B 35/6303 |
| | | | 425/375 |
| 2014/0361464 A1* | 12/2014 | Holcomb | B22F 7/02 |
| | | | 219/635 |
| 2016/0167160 A1* | 6/2016 | Hellestam | B22F 10/20 |
| | | | 219/76.12 |
| 2017/0282283 A1 | 10/2017 | Burke et al. | |
| 2018/0128803 A1* | 5/2018 | Foret | B22F 10/20 |
| 2018/0147655 A1* | 5/2018 | Ackelid | B23K 15/02 |
| 2018/0200790 A1* | 7/2018 | Hart | B33Y 50/02 |
| 2019/0184635 A1* | 6/2019 | Garrett | B23K 26/34 |
| 2019/0283332 A1* | 9/2019 | Brown | B33Y 50/02 |
| 2019/0315063 A1* | 10/2019 | Von Burg | B29C 64/188 |
| 2020/0346407 A1* | 11/2020 | Goodwin | B29C 64/241 |

* cited by examiner

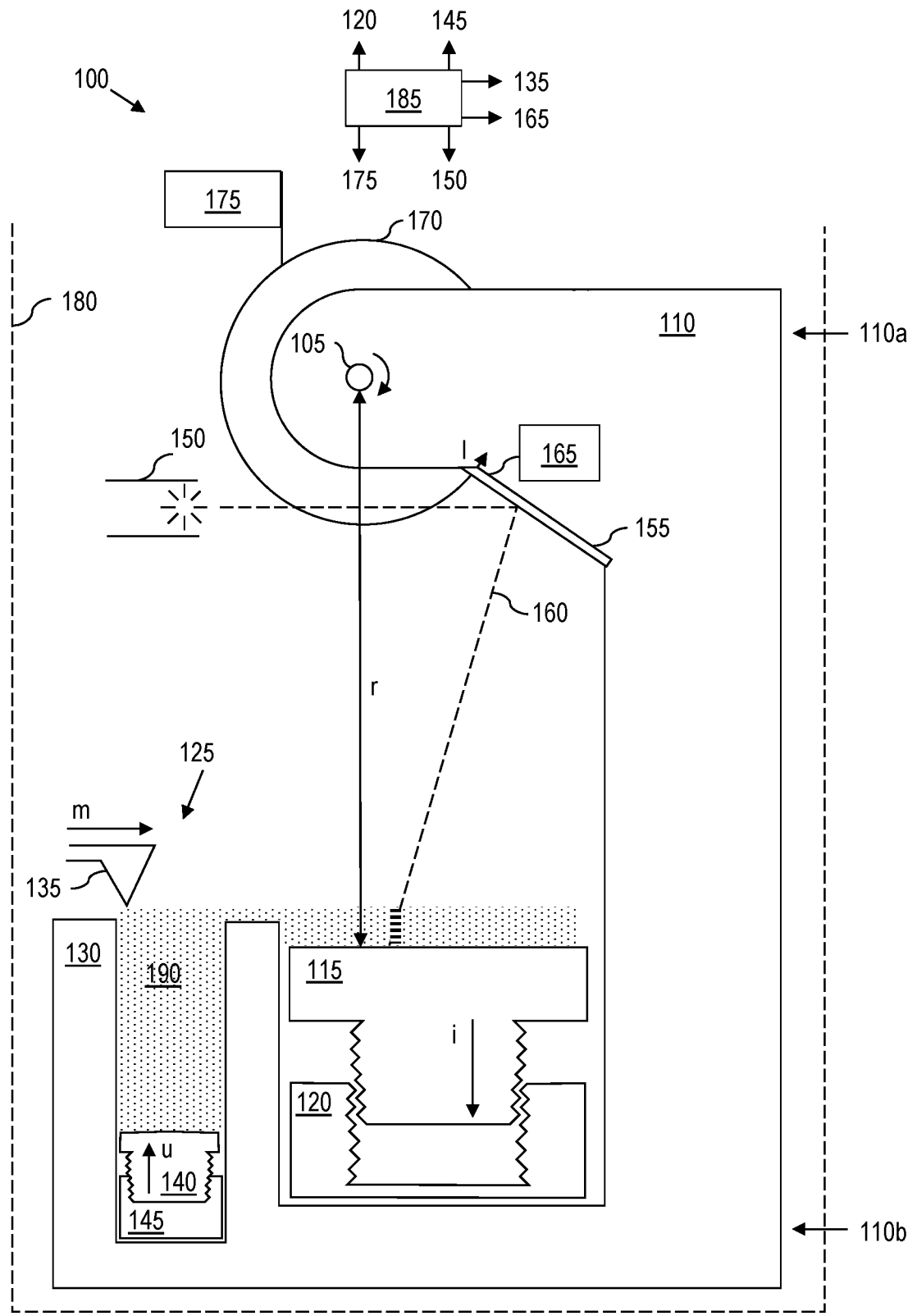

ADDITIVE MANUFACTURING UNDER GENERATED FORCE

CROSS REFERENCE TO RELATED APPLICATIONS

This application claims the benefit of U.S. provisional patent application Ser. No. 62/731,549, filed 2018 Sep. 14, having the title "Additive Manufacturing Under Generated Force," by Salem and Satko, which is incorporated herein by reference in its entirety.

BACKGROUND

Field of the Disclosure

The present disclosure relates generally to manufacturing and, more particularly, to systems and methods for additive manufacturing.

Description of Related Art

Additive manufacturing, such as three-dimensional (3D) printing, has become more sophisticated since its inception and, thus, has found increased applications in different industries. One of these industries is aerospace, which continues to find more uses for additive manufacturing, such as, for example, applications for outer space. As one can imagine, there are ongoing efforts to address these new uses.

SUMMARY

The present disclosure provides systems and processes for additive manufacturing under generated force. Briefly described, one embodiment of the system comprises a motor that applies a centrifugal acceleration to an additive manufacturing build platform, thereby generating a force at the build platform.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a block diagram showing one embodiment of a system for additive manufacturing under generated force.

DETAILED DESCRIPTION OF THE EMBODIMENTS

Newer and newer applications for additive manufacturing (e.g., three-dimensional (3D) printing) are being developed. One such application is the use of additive manufacturing in space (namely, outer space) and/or extraterrestrial bodies. However, there is little-to-no gravitational force in outer space and limited gravitational force e.g. on the Moon, and this lack of gravity creates issues that do not exist on Earth (or other environments with gravity). Both powder-bed and direct-deposition type additive manufacturing processes rely on gravitational forces to constrain materials, direct material transfer, and/or counteract forces generated by spreading mechanisms as well as forces generated during the melting process (e.g. convection, recoil, induction, resistive, etc.). For example, in an absence of gravity, there is a chance that materials that are deposited or placed onto a build platform may shift or, in extreme cases, be ejected from the build platform.

To address issues that may arise in a little-to-no-gravity environment, this disclosure provides systems and processes for additive manufacturing under generated force. Briefly described, one embodiment of the system comprises a motor that applies a centrifugal acceleration to an additive manufacturing build platform. When the build platform is positioned normal to the direction of the centrifugal acceleration, the resulting centrifugal force by deposited material (when viewed in a rotating frame of reference) is applied normal to the surface of the build platform, thereby generating a force that functions similarly to gravity.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a block diagram showing one embodiment of a system 100 for additive manufacturing under generated force. As shown in FIG. 1, the system 100 comprises a rotational center 105 and a mechanical arm 110 extending radially (r) from the rotational center 105. The mechanical arm 110 comprises a central section 110a (toward the rotational center 105) and a peripheral section 110b (away from the rotational center 105). For some embodiments, the mechanical arm 110 is a rigid rod rotationally secured to the rotational center 105.

Continuing with FIG. 1, a build platform 115 is located at the peripheral section 110b of the mechanical arm 110. The build platform is movable incrementally (i) and in parallel to the mechanical arm 110. The system 100 further comprises a build platform controller 120 for controlling the incremental movement (i) of the build platform 115.

The system 100 also comprises a material delivery system 125 for delivering material 190 to the build platform 115. The material delivery system 125 is controlled by a material delivery system controller 145, which controls the amounts of the material 190 delivered to the build platform 115. For some embodiments, the material delivery system 125 comprises a reservoir 130 and a coater (or re-coater or scraper) 135 (or other delivery mechanism). The reservoir 130 houses a piston 140 that pushes (u) the material 190 outside of the reservoir 130 for the coater 135 to push (m) the material 190 onto the build platform 115.

As shown in FIG. 1, the system 100 further comprises a laser scan system 155 which scans the material 190 that is delivered to the build platform 115. For some embodiments, the laser scan system 155 uses a beam 160 from a laser 150 (or other suitable scanning and sintering device, such as, for example, electron beam devices). The laser scan system 155 is controlled by a laser scan system controller 165, which controls or otherwise adjusts (l) the laser scan system 155 so as to properly scan and sinter the material 190 on the build platform 115.

It should be appreciated that the laser 150 can be mounted within the rotating frame of reference or mounted external to the rotating frame of reference and aimed at a reflector within the rotating frame of reference. Insofar as those having skill in the art will appreciate different ways in which to mount the laser 150, only a truncated discussion of the laser 150 is provided here. Furthermore, the laser scan system 155 is substantially replaceable with an electron beam scanning system for melting or sintering the delivered material 190. In other embodiments, the laser scan system 155 is replaceable with an electric arc for melting or sintering the delivered material 190. In some embodiments, a resistive heating system may be used for melting or sintering the delivered material 190. Moreover, an induction heating element system may be used instead of the laser. Those having skill in the art will also understand that, for some embodiments, the material delivery system 145 and the laser scan system 155 are substantially connected, such that material delivery and processing by melting or sintering occur substantially simultaneously.

Continuing, the system 100 further comprises a motor 170 that is operatively coupled to the central section 110a of the mechanical arm 110. The motor 170 rotates the mechanical arm 110 about the rotational center 105, thereby applying a desired centrifugal acceleration to the build platform 115 during rotation of the mechanical arm 110 about the rotational center 105. Because the laser scan system 155 is also mechanically coupled to the mechanical arm 110, the motor 170 further rotates the laser scan system 155 about the rotational center 105 in such a way that the rotation of the laser scan system 155 correlates to the rotation of the mechanical arm 110. The motor 170, which is controlled by a motor controller 175, thereby controls the rotation of both the mechanical arm 110 and the laser scan system 155.

As one can imagine, the amount of force experienced at the build platform 115 can be controlled to simulate the gravitational force of earth. Depending on the needs for other applications, the amount of force can be altered moment-by-moment.

By way of example, in one embodiment, the radial distance between the rotational center 105 and the build platform 115 is approximately fifty (50) centimeters (cm) and the rotational velocity is approximately 42.3 revolutions-per-minute (RPM), thereby imparting a centrifugal acceleration of approximately 9.8 meters-per-squared-second ($m/s^2$) at the surface of the build platform.

Continuing with the embodiment of FIG. 1, the system 100 further comprises a build chamber 180, which houses, among other things, the build platform 115. For additive manufacturing of metals, the build chamber 180 houses argon or other gases that reduce the heat effects of sintering. Because one of the applications is for outer space, for some embodiments, the additive manufacturing occurs in the absence of an atmosphere, thereby also requiring a build chamber 180

In some embodiments, the system 100 further comprises a master controller 185, which is communicatively coupled to the build platform controller 120, the material delivery system controller 145, the laser scan system controller 165, and the motor controller 175. This master controller 185 is responsible for coordinating the various moving parts so that the materials 190 are properly deposited onto the build platform 115 even when the build platform 115 is in motion. Consequently, the master controller 185 is also communicatively coupled to the coater 135 and the laser 150.

In operation, the master controller 185 is configured to determine the incremental movement (i) of the build platform 115 as a function of the amounts of material 190 delivered to the build platform 115. The master controller 185 of FIG. 1 is also configured to determine a location of the material 190 delivered to the build platform 115 and calculate a rate of rotation of the build platform 115. In some embodiments, the rate of rotation is a function of both the location of the material delivered and the desired centrifugal acceleration. The calculated rate of rotation is conveyed by the master controller 185 to the motor controller 175.

It should be appreciated that the generated force can be applied to different types of additive manufacturing processes, such as, for example, fused deposition modeling (FDM) systems, fused filament fabrication (FFF) systems, selective laser sintering (SLS) systems, binder systems, selective laser melting (SLM) systems, direct metal laser sintering (DMLS) systems, directed energy deposition (DED), or other known additive manufacturing systems. Depending on the specific additive manufacturing system, their respective material delivery systems will vary.

By way of example, suitable materials for additive manufacturing in outer space include titanium alloys (e.g., Ti6A14V), superalloys (e.g., Inconel 718), aluminum alloys (e.g., AlSi10Mg). The materials may be in any desired form such as, but not limited to, powder, wire, foil, ribbon, filament, rod, etc.

Because material 190 is deposited onto the build platform 115 while the build platform 115 is in motion, it is possible for the materials 190 to be deposited at location that is not precisely the same as if the materials 190 were deposited in a regular gravitational environment. This is because, in a regular gravitational environment, the additive manufacturing system is substantially stationary.

Because of the possibility of mis-registration, for some embodiments the master controller 185 is also configured to calculate an adjustment factor. Due to the rotational movement, the adjustment factor is a function of at least the location of the material 190 delivered and the calculated rate of rotation of the build platform 115.

As one can see from the embodiment of FIG. 1, additive manufacturing under generated force permits manufacture in a controlled environment. For example, even in an environment with gravity, additional force can be applied to affect the microstructures during manufacture.

Varying the generated force can affect the microstructure of the deposited material through several mechanisms, including changing the density of powder packing during spreading by scraper 135 (also designated as coater or re-coater) and through the interaction of the external generated force with the flow and solidification dynamics of the molten pool generated by the interaction with laser beam 160. This further includes effects of the generated force on mechanisms such as convection and surface tension induced (i.e. Marangoni) flows, recoil pressure due to vaporization, etc.

In the specific context of outer space, the disclosed embodiment compensates for the absence of gravity and reduces several issues that may arise due to the absence of gravity.

The master controller 185, the build platform controller 120, the material delivery system controller 145, the laser scan system controller 165, and the motor controller 175 (collectively designated herein as "controllers") may be implemented in hardware, software, firmware, or a combination thereof. In the preferred embodiment(s), the controllers are implemented in software or firmware that is stored in a memory and that is executed by a suitable instruction execution system. If implemented in hardware, as in an alternative embodiment, the controllers can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Each of the controllers typically requires a corresponding program to implement. The program comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A system comprising:
   a rotational center;
   a mechanical arm extending from the rotational center, the mechanical arm comprising a central section, the mechanical arm further comprising a peripheral section;
   a build platform located at the peripheral section of the mechanical arm, the build platform being movable incrementally and in parallel to the mechanical arm;
   a build platform controller configured for controlling incremental movement of the build platform;
   a material delivery system for delivering material to the build platform;
   a material delivery system controller configured for controlling amounts of the material delivered to the build platform;
   a laser scan system for scanning the material delivered to the build platform;
   a laser scan system controller configured for controlling the laser scan system;
   a motor operatively coupled to the central section of the mechanical arm, the motor for rotating the mechanical arm about the rotational center, a desired centrifugal acceleration being applied to the build platform during rotation of the mechanical arm about the rotational center, the motor further operatively coupled to the laser scan system, the motor for further rotating the laser scan system about the rotational center, rotation of the laser scan system correlating to the rotation of the mechanical arm;
   a motor controller configured for controlling the rotation of the mechanical arm, the motor controller further for controlling the rotation of the laser scan system; and
   a master controller communicatively coupled to the build platform controller, the material delivery system controller, the laser scan system controller, and the motor controller, wherein the master controller is configured to:
      determine a location of the material delivered to the build platform;
      calculate a rate of rotation of the build platform, the rate of rotation being a function of:
         the location of the material delivered; and
         the desired centrifugal acceleration; and
      calculate an adjustment factor to correlate the rotation of the laser scan system to the rotation of the mechanical arm, the adjustment factor being calculated as a function of:
         the location of the material delivered; and
         the calculated rate of rotation of the build platform; and
      convey the calculated rate of rotation to the motor controller.

2. The system of claim 1, further comprising a build chamber housing the build platform.

3. The system of claim 1, wherein the master controller is configured to determine the incremental movement of the build platform as a function of the amounts of material delivered to the build platform.

4. The system of claim 1, wherein the mechanical arm comprises a means for rotationally securing the build platform to the rotational center.

5. The system of claim 4, wherein the means for rotationally securing the build platform to the rotational center is a rigid rod.

6. A system comprising:
   a rotational center;
   a mechanical arm extending from the rotational center;
   a build platform movable incrementally and in parallel to the mechanical arm;
   a build platform controller configured for controlling incremental movement of the build platform;
   a material delivery system for delivering material to the build platform;

a material delivery system controller configured for controlling amounts of the material delivered to the build platform;

a laser scan system for scanning the material delivered to the build platform;

a laser scan system controller configured for controlling the laser scan system;

a motor for rotating the mechanical arm about the rotational center, a centrifugal force being applied to the build platform during rotation of the mechanical arm about the rotational center, the motor for further rotating the laser scan system about the rotational center, rotation of the laser scan system correlating to the rotation of the mechanical arm;

a motor controller configured for controlling the rotation of the mechanical arm, the motor controller further for controlling the rotation of the laser scan system; and a master controller communicatively coupled to the build platform controller, the material delivery system controller, the laser scan system controller, and the motor controller, wherein the master controller is configured to:

determine a location of the material delivered to the build platform;

calculate a rate of rotation of the build platform;

calculate an adjustment factor to correlate the rotation of the laser scan system to the rotation of the mechanical arm, the adjustment factor being calculated as a function of:

the location of the material delivered: and the calculated rate of rotation of the build platform; and convey the calculated rate of rotation to the motor controller.

7. The system of claim 6, wherein the material delivery system and laser scan system are connected, such that material delivery and processing by melting or sintering occur simultaneously.

8. The system of claim 6, wherein the material delivery system delivers a powder material to the build platform.

* * * * *